United States Patent
Shim et al.

(10) Patent No.: US 10,435,512 B2
(45) Date of Patent: Oct. 8, 2019

(54) POLYTHIOL COMPOSITION FOR A PLASTIC OPTICAL LENS

(71) Applicant: SKC CO., LTD., Gyeonggi-do (KR)

(72) Inventors: Jongmin Shim, Gyeonggi-do (KR); Jung Hwan Myung, Gyeonggi-do (KR); Seung Mo Hong, Incheon (KR); Hyuk Hee Han, Gyeonggi-do (KR); Junghwan Shin, Gyeonggi-do (KR); Hyeon Myeong Seo, Ulsan (KR)

(73) Assignee: SKC CO., LTD., Gyeonggi-do (KR)

( * ) Notice: Subject to any disclaimer, the term of this patent is extended or adjusted under 35 U.S.C. 154(b) by 0 days.

(21) Appl. No.: 16/226,149

(22) Filed: Dec. 19, 2018

(65) Prior Publication Data
US 2019/0225755 A1    Jul. 25, 2019

(30) Foreign Application Priority Data

Jan. 19, 2018 (KR) .................. 10-2018-0007050

(51) Int. Cl.
*C08G 75/04* (2016.01)
*C08G 18/76* (2006.01)
(Continued)

(52) U.S. Cl.
CPC ......... *C08G 75/04* (2013.01); *C08G 18/3876* (2013.01); *C08G 18/7642* (2013.01);
(Continued)

(58) Field of Classification Search
CPC .................. C08G 18/3876; C08G 18/3865
See application file for complete search history.

(56) References Cited

U.S. PATENT DOCUMENTS 5,059,673 A * 10/1991 Kanemura ......... C08G 18/3203
528/67
5,084,545 A *  1/1992 Nagata .................... B29C 33/60
351/159.01
(Continued)

FOREIGN PATENT DOCUMENTS

EP        2824126      1/2015
JP       07252207     10/1995
(Continued)

OTHER PUBLICATIONS

Office Action issued by the Korean Intellectual Property Office dated Apr. 23, 2018.
(Continued)

*Primary Examiner* — Michael M Dollinger
(74) *Attorney, Agent, or Firm* — IP & T Group LLP

(57) ABSTRACT

Embodiments relate to a polythiol composition for a plastic optical lens and a polythiourethane-based plastic optical lens prepared therefrom. In the embodiments, a first polythiol compound having mercapto groups only as a hydrogen-bondable functional group and a second polythiol compound having mercapto groups as a hydrogen-bondable functional group and a hydrogen-bondable functional group other than a mercapto group are used in an appropriate amount. Thus, not only is it possible to control the viscosity of a polymerizable composition at the initial stage of polymerization at a low temperature of 5 to 15° C. and to stabilize the rate of increase in the viscosity of the composition and the reaction rate thereof, but also the change in the viscosity at a low temperature is low, thereby preventing the generation of striae, bubbles, and the like. Further, various plastic lenses such as eyeglass lenses, camera lenses, and the like having excellent appearance characteristics (without striae and bubbles) and excellent optical characteristics can be obtained from the composition.

7 Claims, 1 Drawing Sheet

(51) Int. Cl.
C08G 18/38 (2006.01)
G02B 1/04 (2006.01)
C08K 5/37 (2006.01)
C08K 5/00 (2006.01)
C08G 18/24 (2006.01)
C08G 18/73 (2006.01)

(52) U.S. Cl.
CPC ............... C08K 5/37 (2013.01); G02B 1/041 (2013.01); *C08G 18/248* (2013.01); *C08G 18/73* (2013.01); *C08G 18/7621* (2013.01); *C08K 5/005* (2013.01); *C08K 2201/014* (2013.01)

(56) References Cited

U.S. PATENT DOCUMENTS

| | | | | |
|---|---|---|---|---|
| 5,608,115 | A * | 3/1997 | Okazaki | C07C 321/14 568/61 |
| 5,942,158 | A * | 8/1999 | Okoroafor | C08G 18/3876 252/586 |
| 2009/0264613 | A1* | 10/2009 | Kuma | C07C 319/14 528/60 |
| 2018/0016415 | A1* | 1/2018 | Kakinuma | C08K 5/3475 |
| 2018/0022071 | A1* | 1/2018 | Iwamoto | B32B 17/10633 428/430 |
| 2018/0030341 | A1* | 2/2018 | Shimizu | C09K 9/02 |
| 2018/0297943 | A1* | 10/2018 | Kageyama | C07C 319/22 |
| 2018/0362699 | A1* | 12/2018 | Kageyama | C08G 18/3876 |

FOREIGN PATENT DOCUMENTS

| | | |
|---|---|---|
| JP | 09-194558 | 7/1997 |
| KR | 1019920010139 | 6/1992 |
| KR | 1020170018305 | 2/2017 |
| KR | 1020180006419 | 1/2018 |

OTHER PUBLICATIONS

Extended Search Report Issued by European Patent office dated Jun. 3, 2019.

* cited by examiner

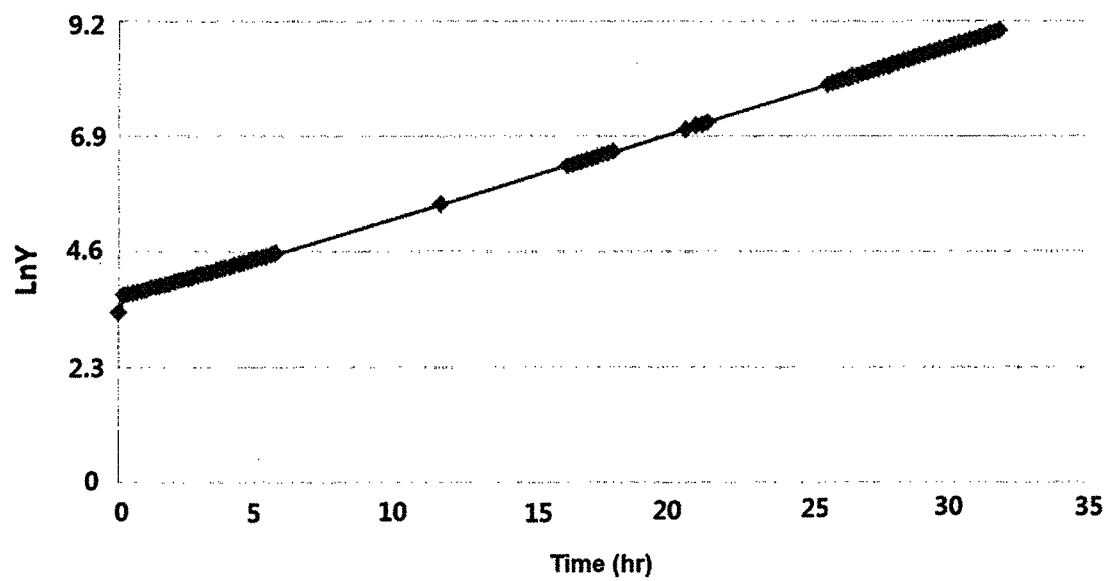

POLYTHIOL COMPOSITION FOR A PLASTIC OPTICAL LENS

TECHNICAL FIELD

Embodiments relate to a polythiol composition for a plastic optical lens and a polythiourethane-based plastic optical lens prepared therefrom.

BACKGROUND ART

Optical materials using plastics are lightweight, hardly breakable, and excellent in dyeability as compared with optical materials made of inorganic materials such as glass. Therefore, plastic materials of various resins are widely used as optical materials for eyeglass lenses, camera lenses, and the like. Recently, due to an increased demand for higher performance and convenience, studies have continued on optical materials having such properties as high transparency, high refractive index, low specific gravity, high heat resistance, and high impact resistance.

Polythiourethane-based compounds are widely used as optical materials by virtue of their excellent optical characteristics and mechanical properties. A polythiourethane-based compound may be prepared by reacting a polythiol compound and an isocyanate compound. The physical properties of the polythiol compound and the isocyanate compound significantly affect the physical properties of the polythiourethane-based compound to be prepared.

Specifically, if a polymerizable composition that comprises a polythiol compound and an isocyanate compound has a low viscosity at the initial stage of polymerization/curing, striae or bubbles may be generated due to the convection of the composition. Thus, an optical material obtained therefrom, for example, a plastic lens, may be defective.

For example, Japanese Laid-open Patent Publication No. Hei 7-252207 discloses a plastic lens obtained from a tetrathiol and a polyiso(thio)cyanate compound. The tetrathiol used in the above patent publication has a problem in that the viscosity during polymerization tends to be excessively increased because it forms a crosslinked structure at a low temperature, resulting in striae.

In order to prevent the generation of striae, bubbles, and the like, a method of using a compound that contains a hydrogen-bondable functional group to increase the viscosity of the composition at the initial stage of polymerization to an appropriate level may be considered. However, if the compound, which contains a hydrogen-bondable functional group, is used in an excessive amount, the rate of increase in the viscosity may be too fast, which may expedite the generation of striae.

PRIOR ART DOCUMENT

Patent Document (Patent document 1) Japanese Laid-open Patent Publication No. Hei 7-252207

DISCLOSURE OF THE INVENTION

Technical Problem to be Solved

Therefore, the embodiments aim to provide a high quality polythiourethane-based compound and a plastic optical lens, in which a polythiol compound having a hydrogen-bondable functional group is used in an appropriate amount to thereby control the rate of increase in the viscosity of a polymerizable composition that comprises the same at the initial stage of polymerization and the reaction rate thereof, thereby reducing the generation of striae, bubbles, and the like.

Solution to the Problem

An embodiment provides a polythiol composition, which comprises a first polythiol compound having at least four mercapto groups only as a hydrogen-bondable functional group; and a second polythiol compound having at least two mercapto groups as a hydrogen-bondable functional group and at least one hydrogen-bondable functional group other than a mercapto group.

Further, an embodiment provides a polymerizable composition, which comprises a polythiol composition comprising a first polythiol compound and a second polythiol compound; and a polyisocyanate compound, wherein the first polythiol compound has at least four mercapto groups only as a hydrogen-bondable functional group; and the second polythiol compound has at least two mercapto groups as a hydrogen-bondable functional group and at least one hydrogen-bondable functional group other than a mercapto group.

In addition, an embodiment provides an optical lens, which comprises a polythiourethane-based resin formed by curing a polymerizable composition, which comprises a polythiol composition comprising a first polythiol compound and a second polythiol compound; and a polyisocyanate compound, wherein the first polythiol compound has at least four mercapto groups only as a hydrogen-bondable functional group; and the second polythiol compound has at least two mercapto groups as a hydrogen-bondable functional group and at least one hydrogen-bondable functional group other than a mercapto group.

Advantageous Effects of the Invention

In the embodiments, a first polythiol compound having mercapto groups only as a hydrogen-bondable functional group and a second polythiol compound having mercapto groups as a hydrogen-bondable functional group and a hydrogen-bondable functional group other than a mercapto group are used in an appropriate amount. Thus, it is possible to control the viscosity of a polymerizable composition at the initial stage of polymerization at a low temperature of 5 to 15° C. and to stabilize the rate of increase in the viscosity of the composition and the reaction rate thereof, thereby preventing the generation of striae, bubbles, and the like. Further, various plastic optical lenses such as eyeglass lenses, camera lenses, and the like having excellent appearance characteristics (without striae and bubbles) and excellent optical characteristics can be obtained from the composition.

BRIEF DESCRIPTION OF THE DRAWING

FIG. 1 is a graph showing the viscosity (Y) of the polymerizable composition of Example 1 with respect to time (hr), wherein the viscosity (Y) is represented in a logarithmic scale (Ln Y).

DETAILED DESCRIPTION FOR CARRYING OUT THE INVENTION

Hereinafter, the present invention will be described in detail with reference to the embodiments. The embodiments are not limited to those described below. Rather, they may be modified into various forms as long as the gist of the invention is not altered.

In this specification, when a part is referred to as "comprising" an element, it is to be understood that the part may comprise other elements as well.

Further, all numbers and expression related to the quantities of components, reaction conditions, and the like used herein are to be understood as being modified by the term "about," unless otherwise indicated.

An embodiment provides a polythiol composition, which comprises a first polythiol compound having at least four mercapto groups only as a hydrogen-bondable functional group; and a second polythiol compound having at least two mercapto groups as a hydrogen-bondable functional group and at least one hydrogen-bondable functional group other than a mercapto group.

In more detail, the first polythiol compound has 4 to 10 mercapto groups only as a hydrogen-bondable functional group; and the second polythiol compound has 2 to 9 mercapto groups as a hydrogen-bondable functional group and 1 to 4 hydrogen-bondable functional groups other than a mercapto group.

In more detail, the first polythiol compound has 4 to 6 mercapto groups only as a hydrogen-bondable functional group; and the second polythiol compound has 2 to 6 mercapto groups as a hydrogen-bondable functional group and 1 to 3 hydrogen-bondable functional groups other than a mercapto group.

In more detail, the first polythiol compound has 4 mercapto groups only as a hydrogen-bondable functional group; and the second polythiol compound has 2 or 3 mercapto groups as a hydrogen-bondable functional group and 1 or 2 hydrogen-bondable functional groups other than a mercapto group.

The first polythiol compound may be employed in an amount of 55 to 99.5% by weight, 60 to 99.5% by weight, 80 to 99.5% by weight, 55 to 90% by weight, 60 to 90% by weight, 75 to 90% by weight, 80 to 90% by weight, 88 to 90% by weight, 88% to 99.5% by weight, or 88% to 99.8% by weight. In addition, the first polythiol compound may have a weight average molecular weight (Mw) of 300 to 500 g/mole or 300 to 400 g/mole.

The hydrogen-bondable functional group other than a mercapto group in the second polythiol compound may be a hydroxyl group, an amine group, an amide group, a carboxyl group, or the like. Specifically, it may be a hydroxyl group.

The second polythiol compound may be employed in an amount of 0.5 to 45% by weight, 0.5 to 40% by weight, 0.5 to 30% by weight, 0.5 to 20% by weight, 10 to 20% by weight, 0.5 to 12% by weight, 0.4 to 12% by weight, or 0.2 to 12% by weight, based on the total weight of the polythiol composition. Within the above amount range, it is possible to appropriately control the viscosity of a polymerizable composition comprising the polythiol composition and to stabilize the increase in the viscosity at the initial stage of polymerization and the polymerization rate, thereby preventing the generation of striae and bubbles.

In addition, the second polythiol compound may have a weight average molecular weight (Mw) of 100 to 500 g/mole or 150 to 400 g/mole.

Further, the second polythiol compound may contain oxygen atoms in an amount of 0.1 to 15% by mole, or 0.5 to 10% by mole, based on the total molar amount of the second polythiol compound.

According to an embodiment, the polythiol composition may comprise a first polythiol compound having 4 mercapto groups only as a hydrogen-bondable functional group; and a second polythiol compound having 2 or 3 mercapto groups as a hydrogen-bondable functional group and 1 or 2 hydroxyl groups.

According to an embodiment, the first polythiol compound may be a compound represented by the following Formula 1, 2, and/or 3, and the second polythiol compound may be a compound represented by the following Formula 4 and/or 5:

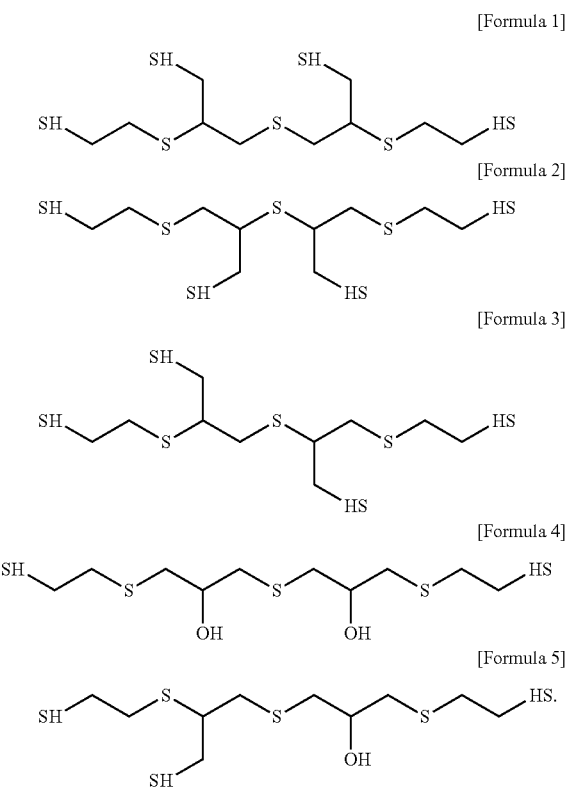 [SMILES: SCCSC(CS)CSCC(CS)SCCS ; SCCSCC(CS)SC(CS)CSCCS ; SCCSCC(CS)SCC(CS)SCCS ; OC(CSCCS)CSCC(O)CSCCS ; OC(CSCCS)CSCC(CS)SCCS]

Specifically, the polythiol composition according to an embodiment may comprise a first polythiol compound represented by the above Formula 1, 2, or 3, and a second polythiol compound represented by the above Formula 4 or 5. Further, the first polythiol compound represented by the above Formulae 1, 2, and 3 may be employed in an amount of 55 to 99.5% by weight or 80 to 90% by weight, and the second polythiol compound represented by the above Formulae 4 and 5 may be employed in an amount of 0.5 to 45% by weight, 0.5 to 40% by weight, 10 to 20% by weight, or 0.5 to 12% by weight, based on the total weight of the polythiol composition.

The polythiol composition according to an embodiment may comprise a first polythiol compound represented by the above Formula 1 or 2, and a second polythiol compound represented by the above Formula 4 or 5. Further, the first polythiol compound represented by the above Formulae 1 and 2 may be employed in an amount of 55 to 99.5% by weight or 80 to 90% by weight, and the second polythiol compound represented by the above Formulae 4 and 5 may be employed in an amount of 0.5 to 45% by weight, 0.5 to 40% by weight, 10 to 20% by weight, or 0.5 to 12% by weight, based on the total weight of the polythiol composition.

The polythiol composition may comprise polythiol compounds prepared by the following process.

Process for Preparing the Polythiol Compounds Represented by Formulae 1 to 5

An embodiment provides a process for preparing a polythiol compound, which comprises: (1) subjecting a compound represented by the following Formula 6 and mercaptoethanol to a non-hydorcondensation reaction to obtain a compound represented by the following Formula 7; (2) reacting the compound represented by the following Formula 7 with a metal sulfide to prepare a compound represented by the following Formula 8; (3) reacting the compound represented by the following Formula 8 with thiourea in the presence of hydrogen chloride to obtain an isothiouronium salt; and (4) hydrolyzing the isothiouronium salt to obtain a compound selected from the group consisting of the compounds represented by the following Formulae 1 to 5:

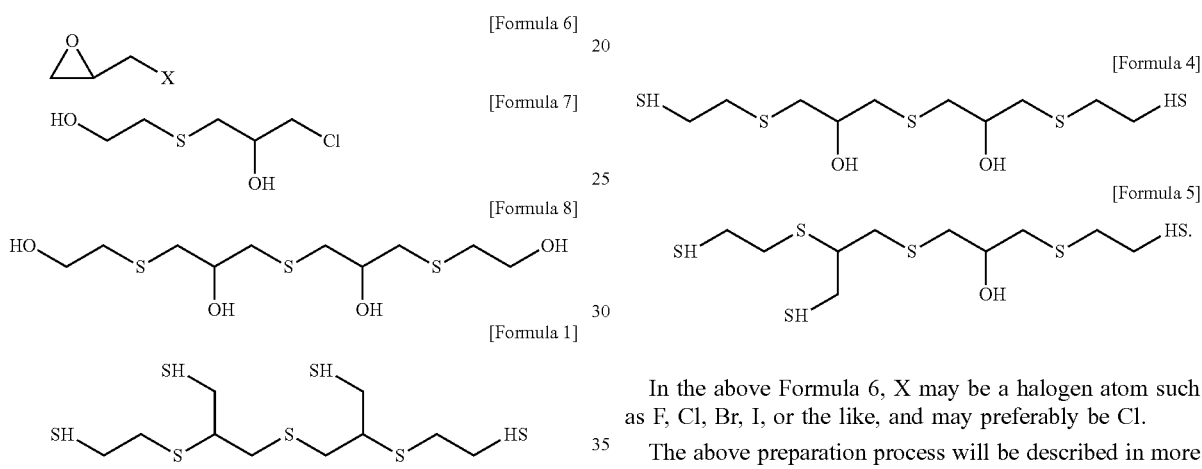

In the above Formula 6, X may be a halogen atom such as F, Cl, Br, I, or the like, and may preferably be Cl.

The above preparation process will be described in more detail with reference to Reaction Scheme 1 below.

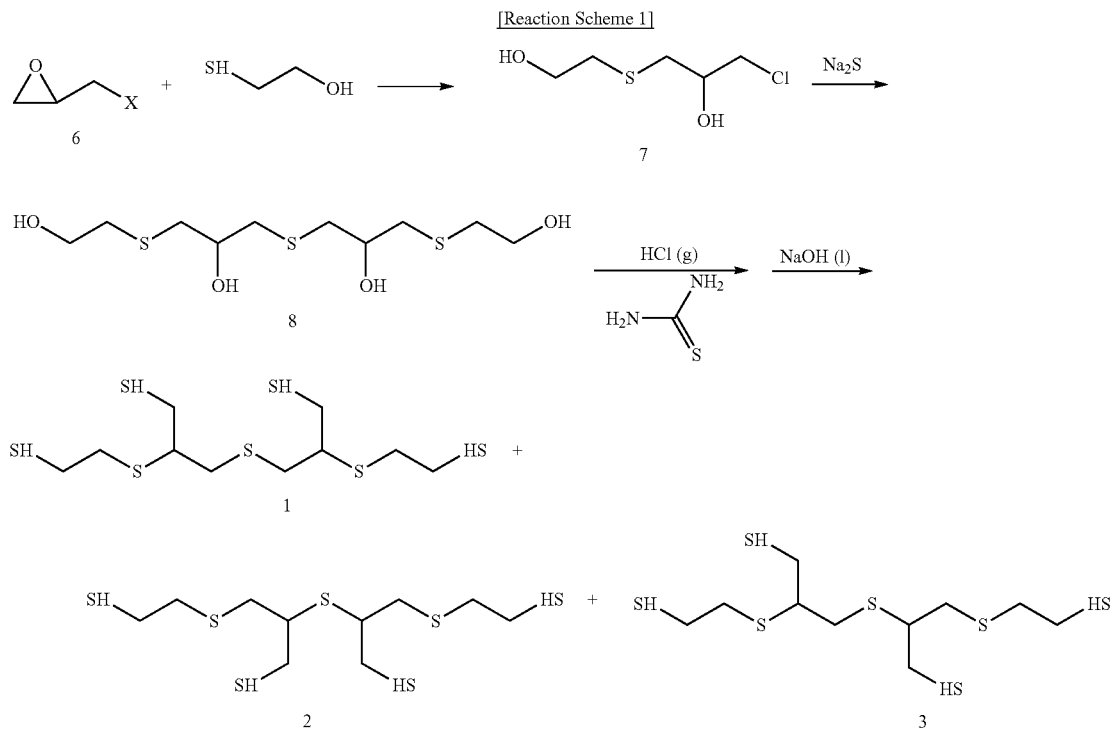

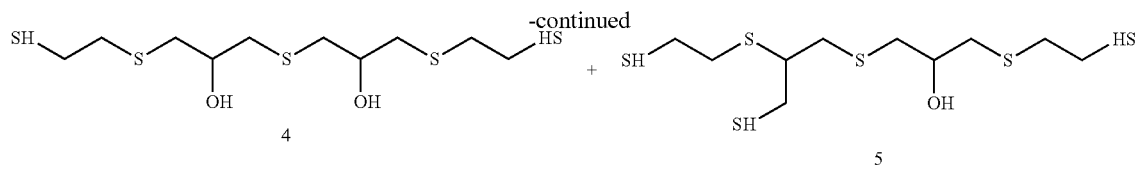

Specifically, in the above step (1), 2-mercaptoethanol may be reacted with a compound of Formula 6 in the presence of a base as a reaction catalyst to prepare a diol compound of Formula 7. In such event, water may not be used in the reaction. The reaction may be carried out at a temperature of −5 to 15° C., 0 to 12° C., or 5 to 10° C., for 2 to 10 hours, 2 to 8 hours, or 2 to 5 hours. Further, the amount of 2-mercaptoethanol may be 0.5 mole to 3 moles, particularly 0.7 mole to 2 moles, more particularly 0.9 mole to 1.1 moles, per 1 mole of the compound of Formula 6. In addition, the base may be used in a catalytic amount. Specifically, the amount of the base may be 0.001 mole to 0.1 mole per 1 mole of the compound of Formula 6. Here, the base as a reaction catalyst may be at least one selected from the group consisting of a tertiary amine, a quaternary ammonium salt, triphenylphosphine, and a trivalent chromium compound. For example, the base may be triethylamine, triphenylphosphine, triethyl ammonium chloride, chromium (III) octoate, or the like.

In the above step (2), the diol compound of Formula 7 may be reacted with a metal sulfide in a solvent to prepare a tetraol compound represented by Formula 8. The reaction may be carried out at a temperature of 10 to 50° C., particularly 20 to 40° C., for 1 to 10 hours, 1 to 8 hours, or 1 to 5 hours. The metal sulfide may be, for example, sodium sulfide hydrate ($Na_2S_xH_2O$), specifically sodium sulphate pentahydrate ($Na_2S_5H_2O$), or sodium sulphide enneahydrate ($Na_2S_9H_2O$). The metal sulfide may be used in the form of an aqueous solution or solid. The metal sulfide may be used in an amount of 0.4 to 0.6 mole, particularly 0.45 to 0.57 mole, more particularly 0.48 to 0.55 mole, per 1 mole of the diol compound of Formula 7.

In the above step (3), the tetraol compound of Formula 8 thus obtained may be reacted with thiourea to prepare an isothiouronium salt, which is then hydrolyzed to prepare a compound of Formula 1. In such event, structural isomers (i.e., polythiol compounds represented by the Formulae 2 and 3) of the polythiol compound represented by the above Formula 1 may be obtained. But the content thereof may be 12% by weight or less, 10% by weight or less, 0.5 to 12% by weight, or 0.5 to 10% by weight.

Specifically, the tetraol compound of Formula 8 may be mixed with thiourea with reflux in an acidic condition to prepare an isothiouronium salt. Thiourea may be used in an amount of 1 to 2 moles, or 1 to 1.5 moles, based on 1 mole of the hydrogen-bondable functional group of the compound represented by the above Formula 8. For the acidic condition, a hydrochloric acid solution, a hydrogen chloride gas, or the like may be used in an amount of 1.0 to 2.5 moles, or 1.1 to 2.3 moles, based on 1 mole of the hydrogen-bondable functional group of the compound represented by the above Formula 8. The use of hydrogen chloride may secure a sufficient reaction rate and prevent coloring of the product. The reflux may be conducted at a temperature of 90 to 120° C., particularly 100 to 110° C., for 1 to 10 hours.

Meanwhile, if the contents of hydrogen chloride and thiourea are changed in the above step (3), the final product may be different.

Specifically, if thiourea is used in an amount of 0.5 to 0.99 mole, or 0.65 to 0.99 mole, based on 1 mole of the hydrogen-bondable functional group of the compound represented by the above Formula 8, and if the acid (e.g., hydrogen chloride) is used in an amount of 0.8 to 1.5 moles, or 1 to 1.5 moles, based on 1 mole of the hydrogen-bondable functional group of the compound represented by the above Formula 8, in the above step (3) for the reaction, the compounds represented by the above Formulae 4 and 5, that is, polythiol compounds containing a hydroxy group, may be prepared.

An embodiment provides a polymerizable composition, which comprises the polythiol composition as described above, a polyisocyanate compound, and a polymerization catalyst. Specifically, the polymerizable composition comprises a polythiol composition comprising a first polythiol compound and a second polythiol compound; and a polyisocyanate compound, wherein the first polythiol compound has at least four mercapto groups only as a hydrogen-bondable functional group; and the second polythiol compound has at least two mercapto groups as a hydrogen-bondable functional group and at least one hydrogen-bondable functional group other than a mercapto group.

The polymerizable composition may further comprise a polymerization catalyst. For example, it may further comprise a polymerization catalyst such as dibutyl tin dichloride, dimethyl tin dichloride, or the like.

After the polymerizable composition is degassed at a temperature of 5 to 15° C. and a pressure of 0.1 to 10 torr for 0.5 to 3 hours, it may have a viscosity of 50 to 100 cps, 60 to 100 cps, 70 to 100 cps, or 75 to 100 cps, at a temperature of 5 to 15° C. or at a temperature of 10° C. Only when the polymerizable composition has a viscosity within the above range, the reactivity can be maintained during the polymerization, thereby preventing the generation of bubbles and preventing such uneven hardening as striae upon curing thereof.

The change (D) in the viscosity of the polymerizable composition according to the following Equation 1 may be 0.14 to 0.26 or 0.14 to 0.24:

$$\text{Ln } Y = \ln A + DX \qquad \text{[Equation 1]}$$

In the above Equation, X is time (hr), Y is the viscosity (cps) of the polymerizable composition at 10° C. with respect to time, and A is the initial viscosity of the polymerizable composition at 10° C.

The polyisocyanate compound is not particularly limited as long as it is a compound having at least two isocyanate groups in the molecule.

Specifically, examples of the polyisocyanate compound may include an aliphatic polyisocyanate compound such as hexamethylene diisocyanate, 1,5-pentane diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, bis(isocyanatoethyl) ether, lysine diisocyanato methyl ester, lysine triisocyanate, 1,2-diisothiocyanatoethane, 1,6-diisothiocyanatohexane, isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)-bicyclo[2.2.1]heptane, 2,6-bis(isocyanatomethyl)-bicyclo[2.2.1]heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, bis(4-isocyanatocyclohexyl)methane, 1,3-bis(isocyanatomethyl)cyclohexane, 1,4-bis(isocyanatomethyl)cyclohexane, and cyclohexane diisothiocyanate; an aromatic polyisocyanate compound such as 1,2-diisocyanatobenzene, 1,3-diisocyanatobenzene, 1,4-diisocyanatobenzene, tolylene diisocyanate, 2,4-diisocyanatotoluene, 2,6-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluene diisocyanate, toluidine diisocyanate, 4,4'-methylene-bis(phenyl isocyanate), 4,4'-methylene-bis(2-methylphenyl isocyanate), dibenzyl-4,4'-diisocyanate, bis(isocyanatophenyl)ethylene, bis(isocyanatomethyl)benzene, m-xylene diisocyanate, bis(isocyanatoethyl)benzene, bis(isocyanatopropyl)benzene, α,α,α',α'-tetramethyl xylylene diisocyanate, bis(isocyanatobutyl)benzene, bis(isocyanatomethyl)naphthalene, bis(isocyanatomethylphenyl) ether, bis(isocyanatoethyl)phthalate, 2,5-di(isocyanatomethyl)furan, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene-bis(phenyl isothiocyanate), 4,4'-methylene-bis(2-methylphenyl isothiocyanate), 4,4'-methylene-bis(3-methylphenyl isothiocyanate), 4,4'-diisothiocyanatobenzophenone, 4,4'-diisothiocyanato-3,3'-dimethylbenzophenone, and bis(4-isothiocyanatophenyl)ether; an aliphatic polyisocyanate compound containing sulfur such as bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanate methyl thiophene, 4-isocyanatoethylthio-2,6-dithia-1,8-octane diisocyanate, thiobis(3-isothiocyanatopropane), thiobis(2-isothiocyanatoethane), dithiobis(2-isothiocyanatoethane), 2,5-diisocyanatotetrahydrothiophene, 2,5-diisocyanatomethyltetrahydrothiophene, 3,4-diisocyanatomethyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane, and 4,5-diisocyanatomethyl-2-methyl-1,3-dithiolane; an aromatic sulfide-based polyisocyanate compound such as 2-isocyanatophenyl-4-isocyanatophenyl sulfide, bis(4-isocyanatophenyl) sulfide, and bis(4-isocyanatomethylphenyl) sulfide; an aromatic disulfide-based polyisocyanate compound such as bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, and bis(4-methoxy-3-isocyanatophenyl) disulfide.

More specifically, the polyisocyanate compound may be 1,3-bis(isocyanatomethyl)cyclohexane, hexamethylene diisocyanate, isophorone diisocyanate, m-xylene diisocyanate, toluene diisocyanate, or a mixture thereof.

In addition, it is also possible to use a halogen-substituted form such as chlorine substituted form, a bromine substituted form, or the like, an alkyl substituted form, an alkoxy substituted form, a nitro substituted form, a prepolymer-type modified form with a polyhydric alcohol, a carbodiimide modified form, a urea modified form, a biuret modified form, or a dimerization or trimerization reaction product of the polyisocyanate compound as described above. In such event, the above-exemplified compounds may be used alone or in combination of two or more thereof.

The polymerizable composition may further comprise such additives as an internal mold release agent, a heat stabilizer, an ultraviolet absorber, and a bluing agent, depending on the purpose thereof.

Examples of the internal mold release agent include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester. It may be used alone or in combination of two or more.

As the heat stabilizer, a metal fatty acid salt, a phosphorus compound, a lead compound, or an organotin compound may be used alone or in combination of two or more.

As the ultraviolet absorber, benzophenone-based, benzotriazole-based, salicylate-based, cyanoacrylate-based, oxanilide-based, or the like may be used.

The bluing agent has an absorption band in the wavelength range from orange to yellow in the visible light region and has a function of adjusting the color of an optical material made of a resin. Specifically, the bluing agent may comprise a material that exhibits blue to violet color, but is not particularly limited thereto. In addition, examples of the bluing agent include a dye, a fluorescent whitening agent, a fluorescent pigment, and an inorganic pigment. It may be properly selected in accordance with the properties required for an optical component to be produced and the resin color. The bluing agent may be used alone or in combination of two or more.

In view of the solubility in the polymerizable composition and the transparency of the optical material to be produced, a dye is preferably used as the bluing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the bluing agent is not particularly limited, and the bluing agent may be added to the monomers in advance. Specifically, various methods can be used; for example, the bluing agent may be dissolved in the monomers or may be contained in a master solution in a high concentration, the master solution being later diluted with the monomers or other additives and then added.

An embodiment provides a polythiourethane-based compound prepared from the polymerizable composition as described above. Specifically, in an embodiment, the polymerizable composition as described above may be preliminarily polymerized at a low temperature of 5° C. to 15° C. and then cured to prepare a polythiourethane-based compound.

More specifically, the polymerizable composition is degassed under reduced pressures and then injected into a mold for molding a lens. Such degassing and mold injection may be carried out in a low temperature range of, for example, 0 to 30° C. or 5 to 15° C. Once the composition is injected into the mold, preliminary polymerization is carried out under the same temperature condition (i.e., at a low temperature) to stabilize the polymerization rate. Specifically, the preliminary polymerization is carried out at a temperature of 0 to 30° C. or 5 to 15° C. for 1 to 30 hours, or 1 to 20 hours, so as to prevent a high reaction rate during the thermal curing, i.e., to prevent a convection phenomenon that may be caused by rapid curing and the defective appearance of a lens such as striae generated by the convection phenomenon.

Upon the preliminary polymerization, polymerization is carried out by a conventional method. For example, the polymerization is usually carried out by gradually heating the composition from a low temperature to a high temperature. The polymerization temperature may be, for example, 20 to 150° C., particularly 25 to 130° C.

Then, the polythiourethane-based plastic optical lens is released from the mold.

The polythiourethane-based plastic optical lens may have various shapes by changing the mold used in the production thereof. Specifically, it may be in the form of an eyeglass lens, a camera lens, or the like.

An embodiment is capable of providing a polythiourethane-based plastic optical lens prepared from a polythiourethane-based compound by the process as described above.

If required, the plastic optical lens may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

The plastic optical lens may have a refractive index of 1.6620 to 1.6700 or 1.6630 to 1.6690.

As described above, in the embodiments, a first polythiol compound having mercapto groups only as a hydrogen-bondable functional group and a second polythiol compound having mercapto groups as a hydrogen-bondable functional group and a hydrogen-bondable functional group other than a mercapto group are used in an appropriate amount. Thus, not only is it possible to control the viscosity of a polymerizable composition at the initial stage of polymerization at a low temperature of 5 to 15° C. and to stabilize the rate of increase in the viscosity of the composition and the reaction rate thereof, but also the change in the viscosity at a low temperature is low, thereby preventing the generation of striae, bubbles, and the like. Further, various plastic optical lenses such as eyeglass lenses, camera lenses, and the like having excellent appearance characteristics (without striae and bubbles) and excellent optical characteristics can be obtained from the composition.

Hereinafter, the present invention is explained in detail by Examples. The following Examples are intended to further illustrate the present invention, and the scope of the Examples is not limited thereto.

EXAMPLE

Synthesis Example 1: Preparation of a Polythiol Composition

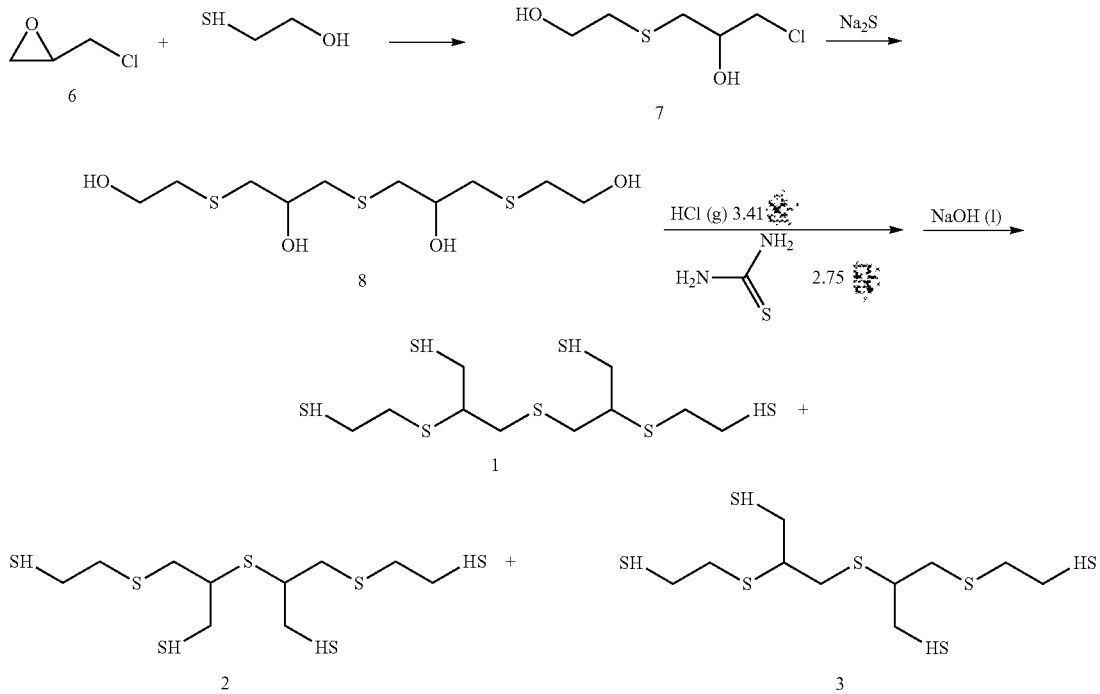

A reaction flask equipped with a stirrer, a thermometer, a reflux condenser, and a nitrogen line was charged with 51.5 g of water, 1.86 g of triethylamine, and 102.4 g (1.31 moles) of 2-mercaptoethanol. 123.7 g (1.34 moles) of epichlorohydrin was added thereto dropwise at 10° C. over 6 hours, followed by stirring the mixture for 1 hour. Subsequently, 78.1 g of an aqueous sodium sulfide solution (25%) was added thereto dropwise at 23° C. over 4.5 hours, followed by further stirring the mixture for 3 hours.

Subsequently, 345.5 g (3.41 moles) of hydrochloric acid (36%) and 209.5 g (2.75 moles) of thiourea were added thereto, followed by stirring the mixture for 8.5 hours with reflux at 110° C. for the reaction to produce a thiouronium salt.

After the reaction mixture was cooled to 50° C., 295 g of toluene was added and 393.2 g of an aqueous potassium hydroxide solution (40%) was added dropwise over 2.5 hours, followed by further stirring the mixture for 2 hours for carrying out the hydrolysis reaction. Then, acid washing and water washing were carried out, followed by the removal of toluene and a minute amount of water under heating and depressurization, to thereby obtain 465.5 g of a polythiol composition comprising the compound represented by Formula 1 as a main component.

The polythiol composition thus obtained was quantified by an absolute calibration method using a liquid chromatograph (Shimadzu, Nexera SR, detector: photo-diode array (PDA)) to analyze the compounds contained in the composition. As a result, the polythiol composition thus obtained contained 86.0% by weight of the polythiol compounds (a first polythiol compound) represented by Formulae 1, 2, and 3, 3.5% by weight of the polythiol compound represented by Formula 5 (a second polythiol compound), and 10.5% by weight of oligomeric compounds other than the Formulae 1 to 5. Here, the above Formulae 1, 2, and 3 are structural isomers.

Synthesis Example 2: Preparation of a Polythiol Composition

The same procedure as in Synthesis Example 1 was carried out, except that 292.3 g (2.88 moles) of hydrochloric acid (36%) and 139.7 g (1.83 moles) of thiourea were used in the reaction for the thiouronium salt and that 281 g of toluene was used.

As a result of the above reaction, 412.6 g of a polythiol composition containing the polythiol compound represented by the above Formula 5 as a main component was obtained. As a result of an analysis of the composition thus obtained by an absolute calibration method, the polythiol composition thus obtained contained 62% by weight of the polythiol compound (a second polythiol compound) represented by Formula 5, 17% by weight of the polythiol compound represented by Formula 4 (a second polythiol compound), 20% by weight of the polythiol compounds (a first polythiol compound) represented by Formulae 1 to 3, and 1% by weight of oligomeric compounds other than the Formulae 1 to 5.

Preparation of a Plastic Optical Lens

Example 1

201.4 g of m-xylene diisocyanate, 2.4 g of 2-(2-hydroxy-5-tert-octylphenyl)benzotriazole, and 0.22 g of Zelec® UN (acidic phosphate alkyl ester release agent, Stepan Company) were homogeneously mixed. 176.6 g of the polythiol composition of the Synthesis Example 1 and 19.8 g of the polythiol composition of the Synthesis Example 2 were mixed at 15° C., to thereby prepare 196.4 g of a polythiol composition.

In such event, the polythiol composition was prepared based on the contents of the Synthesis Examples 1 and 2 such that it contained 79.4% by weight of the polythiol compounds (a first polythiol compound) represented by the Formulae 1 to 3 and 11.1% by weight of the polythiol compounds represented by the Formulae 4 and 5 (a second polythiol compound).

Examples 2 and 3 and Comparative Examples 1 and 2

The same procedure as in Example 1 was carried out, except that the contents of the first polythiol compound and the second polythiol compound were changed as shown in Table 1 below.

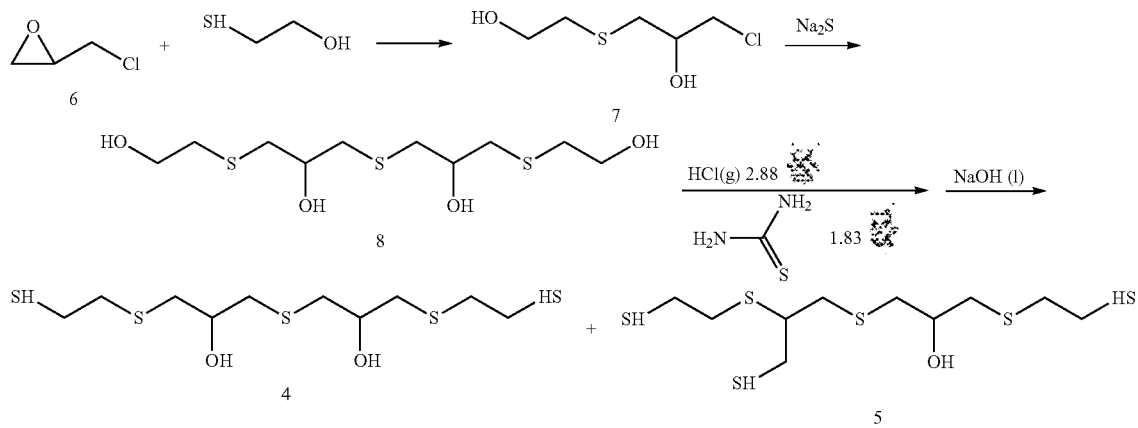

EVALUATION EXAMPLE

Evaluation Example 1: Viscosity (Y) and Changes (D) in Viscosity of a Polymerizable Composition The properties of the polymerizable compositions prepared in Examples 1 to 3 and Comparative Examples 1 and 2 were measured in accordance with the methods as described below. The results are shown in Table 1 below.

(1) Viscosity (Y) and Changes (D) in Viscosity

The polymerizable compositions of Examples 1 to 3 and Comparative Examples 1 and 2 were each degassed and filtered. The initial viscosity (Y, cps) and the viscosity (Y, cps) after 5 hours were measured at 10° C. using a non-contact viscometer (EMS-1000, Kyoto Electronics Manufacturing Co., Ltd.). The change (D) in the viscosity was calculated with Equation 1.

Meanwhile, the viscosity (Y) of the polymerizable composition of Example 1 was measured with respect to time, and the viscosity (Y) is represented in a logarithmic scale (Ln Y) in FIG. 1.

Evaluation Example 2: Measurement of the Properties of a Lens

The properties of the plastic lenses prepared in Examples 1 to 3 and in Comparative Examples 1 and 2 were each measured in accordance with the methods as described below. The measurement results are shown in Table 1 below.

(1) Refractive Index

The refractive index of each of the lenses prepared in Examples 1 to 3 and Comparative Examples 1 and 2 was measured at 20° C. using a refractometer DR-M4 manufactured by Atago Co.

(2) Generation Rate of Striae

For 100 lenses prepared in Examples 1 to 3 and Comparative Examples 1 and 2, light was transmitted through a lens using a mercury lamp as a light source. The transmitted light was projected onto a white plate, and the presence or absence of a contrast was visually checked to determine the generation of striae. The generation rate of a striae was evaluated as (number of lenses that have striae/number of lenses measured (100))*100.

TABLE 1

| | Type and content (wt. %) of a polythiol compound | | | | Generation | Refractive |
|---|---|---|---|---|---|---|
| | First polythiol | | Second polythiol | | D | rate of striae | index |
| Ex. 1 | Formulae 1 to 3 | 79.4% | Formulae 4 and 5 | 11.1% | 0.2012 | 6 | 1.6657 |
| Ex. 2 | Formulae 1 to 3 | 78.7% | Formulae 4 and 5 | 3.4% | 0.1945 | 3 | 1.6667 |
| Ex. 3 | Formulae 1 to 3 | 82.7% | Formulae 4 and 5 | 1.1% | 0.1667 | 2 | 1.6676 |
| C. Ex. 1 | Formulae 1 to 3 | 60.4% | Formulae 4 and 5 | 22.8% | 0.3109 | 21 | 1.6619 |
| C. Ex. 2 | Formulae 1 to 3 | 85.1% | Formulae 4 and 5 | 0.3% | 0.1217 | 14 | 1.6679 |

As shown in Table 1, the polythiol compositions of the Examples and the Comparative Examples showed that as the content of the second polythiol compounds (Formulae 4 and 5) having a hydrogen-bondable functional group other than a mercapto groups increased, the initial viscosity and the viscosity after 5 hours were increased and that the generation rate of striae was increased with the increased viscosity. However, in Comparative Examples 1 and 2, in which the content of the second polythiol compound was less than, or greater than, the content of the second polythiol compound in the Examples, which was 0.5 to 12% by weight, the generation rate of striae was high and the change in the viscosity was large as well. Thus, it was confirmed that as the content of the second polythiol having a hydrogen-bondable functional group other than a mercapto group is increased, the generation rate of striae may be somewhat reduced. However, when the level of the second polythiol exceeds the appropriate level, the change in the viscosity would be large or the generation rate of striae would be high.

The invention claimed is:

1. A polythiol composition, which comprises a first polythiol compound having at least four mercapto groups only as a hydrogen-bondable functional group; and a second polythiol compound having at least two mercapto groups as a hydrogen-bondable functional group and at least one hydrogen-bondable functional group other than a mercapto group wherein the first polythiol compound is a compound represented by the following Formula 1, 2, or 3, and the second polythiol compound is a compound represented by the following Formula 4 or 5:

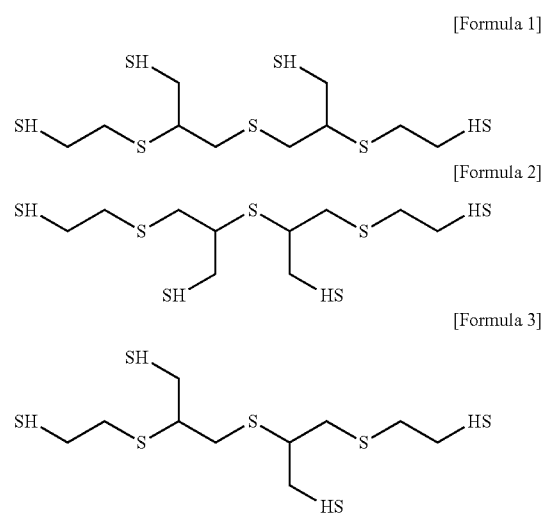

-continued

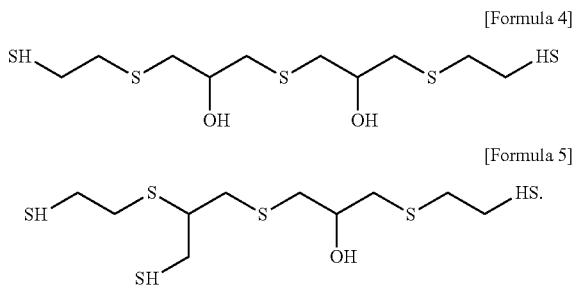

2. The polythiol composition of claim 1, which comprises the first polythiol compound in an amount of 55 to 99.5% by weight and the second polythiol compound in an amount of 0.5 to 45% by weight, based on the total weight of the polythiol composition.

3. The polythiol composition of claim 2, which comprises the second polythiol compound in an amount of 0.5 to 12% by weight based on the total weight of the polythiol composition.

4. A polymerizable composition, which comprises a polythiol composition comprising a first polythiol compound and a second polythiol compound; and a polyisocyanate compound,
wherein the first polythiol compound has at least four mercapto groups only as a hydrogen-bondable functional group; and
the second polythiol compound has at least two mercapto groups as a hydrogen-bondable functional group and at least one hydrogen-bondable functional group other than a mercapto group
the first polythiol compound is a compound represented by the following Formula 1, 2, or 3, and
the second polythiol compound is a compound represented by the following Formula 4 or 5:

[Formula 1]
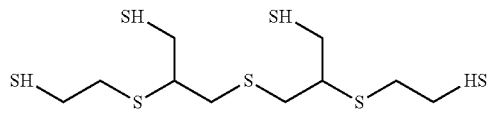

[Formula 2]
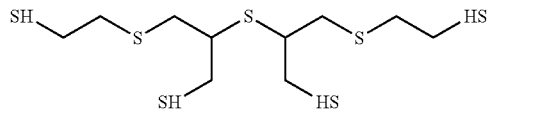

[Formula 3]
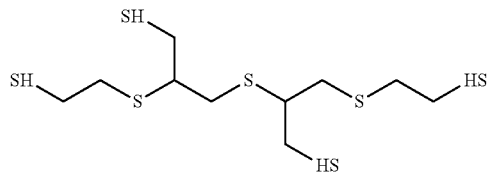

[Formula 4]
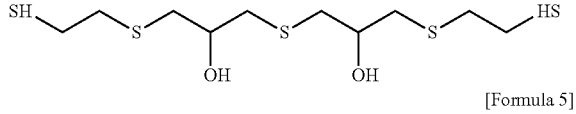

[Formula 5]
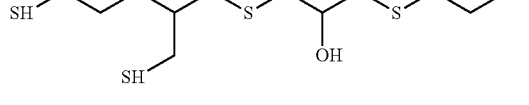

5. The polymerizable composition of claim 4, which further comprise a polymerization catalyst,
wherein the change (D) in the viscosity of the polymerizable composition according to the following Equation 1 is 0.14 to 0.26:

Ln Y=ln A+DX  [Equation 1]

In the above Equation, X is time (hr), Y is the viscosity (cps) of the polymerizable composition at 10° C. with respect to time, and A is the initial viscosity of the polymerizable composition at 10° C.

6. The polymerizable composition of claim 4, wherein the polyisocyanate compound is selected from the group consisting of 1,3-bis(isocyanatomethyl)cyclohexane, hexamethylene diisocyanate, isophorone diisocyanate, m-xylene diisocyanate, toluene diisocyanate, and a mixture thereof.

7. An optical lens, which comprises a polythiourethane-based resin formed by curing a polymerizable composition, which comprises a polythiol composition comprising a first polythiol compound and a second polythiol compound; and a polyisocyanate compound,
wherein the first polythiol compound has at least four mercapto groups only as a hydrogen-bondable functional group;
the second polythiol compound has at least two mercapto groups as a hydrogen-bondable functional group and at least one hydrogen-bondable functional group other than a mercapto group,
the first polythiol compound is a compound represented by the following Formula 1, 2, or 3, and
the second polythiol compound is a compound represented by the following Formula 4 or 5:

[Formula 1]
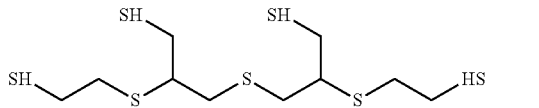

[Formula 2]
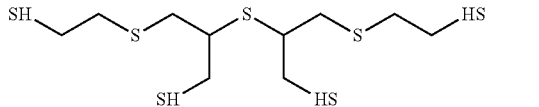

[Formula 3]
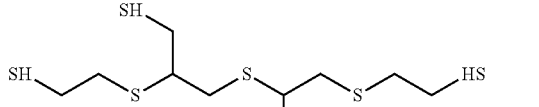

[Formula 4]
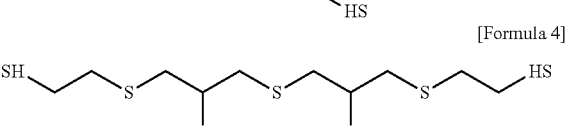

[Formula 5]
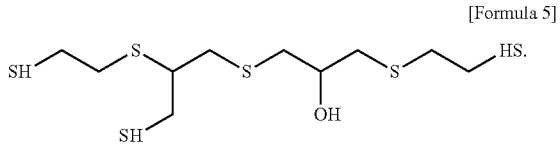

* * * * *